United States Patent
Nammi et al.

(10) Patent No.: US 9,986,575 B2
(45) Date of Patent: May 29, 2018

(54) METHOD AND NODE FOR CONTROLLING COMBINING OF RADIO SIGNALS FROM A USER EQUIPMENT

(71) Applicant: Telefonaktiebolaget L M Ericsson (publ), Stockholm (SE)

(72) Inventors: Sairamesh Nammi, Kista (SE); Cagatay Konuskan, Oslo (NO)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 213 days.

(21) Appl. No.: 14/892,648

(22) PCT Filed: May 22, 2013

(86) PCT No.: PCT/SE2013/050587
§ 371 (c)(1),
(2) Date: Nov. 20, 2015

(87) PCT Pub. No.: WO2014/189420
PCT Pub. Date: Nov. 27, 2014

(65) Prior Publication Data
US 2016/0192375 A1    Jun. 30, 2016

(51) Int. Cl.
*H04W 72/08* (2009.01)
*H04W 72/04* (2009.01)
(Continued)

(52) U.S. Cl.
CPC .......... *H04W 72/085* (2013.01); *H04B 7/024* (2013.01); *H04B 7/0632* (2013.01);
(Continued)

(58) Field of Classification Search
None
See application file for complete search history.

(56) References Cited

U.S. PATENT DOCUMENTS

2010/0203887 A1    8/2010    Kim et al.
2011/0065448 A1*   3/2011    Song ................. H04B 7/0632
                                                  455/452.2
(Continued)

FOREIGN PATENT DOCUMENTS

CN    102301785 A    12/2011
WO    2005079099 A1    8/2005
(Continued)

OTHER PUBLICATIONS

Simonsson, Arne et al., "LTE Uplink CoMP Trial in a HetNet Deployment", IEEE Vehicular Technology Conference, Sep. 3-6, 2012, 1-5.
(Continued)

*Primary Examiner* — Charles C Jiang
*Assistant Examiner* — George Atkins, Jr.
(74) *Attorney, Agent, or Firm* — Murphy, Bilak & Homiller, PLLC (57) ABSTRACT

A method and controlling node (500) to control a signal combining operation performed on uplink radio signals transmitted from a User Equipment, UE, in a combined cell served by multiple radio nodes (502). Signal quality information (SQ) is received from the UE indicating a signal quality measured by the UE on a node-specific probing pilot signal (PS1-PS4) transmitted from each of the multiple radio nodes, and a subset (RN2-RN3) of the multiple radio nodes is selected based on the received channel quality information. The signal combining operation is then performing (204) on the uplink radio signals received by the selected subset of the multiple radio nodes. Thereby, the performance of the signal combining operation can be improved.

18 Claims, 3 Drawing Sheets

(51) Int. Cl.
*H04L 12/26* (2006.01)
*H04B 7/024* (2017.01)
*H04B 7/06* (2006.01)
*H04W 76/02* (2009.01)

(52) U.S. Cl.
CPC ......... *H04L 43/16* (2013.01); *H04W 72/0413* (2013.01); *H04W 76/025* (2013.01)

(56) References Cited

U.S. PATENT DOCUMENTS

| | | | |
|---|---|---|---|
| 2012/0218968 | A1 | 8/2012 | Kim et al. |
| 2013/0083754 | A1* | 4/2013 | Chen ................. H04W 72/0406 370/329 |
| 2013/0114523 | A1 | 5/2013 | Chatterjee et al. |
| 2013/0343317 | A1* | 12/2013 | Etemad .................. H04B 7/024 370/329 |
| 2014/0022924 | A1* | 1/2014 | Cili ....................... H04W 24/08 370/252 |
| 2015/0043542 | A1* | 2/2015 | Hoehne ............. H04W 72/0406 370/336 |
| 2015/0156657 | A1* | 6/2015 | Ji ........................... H04B 7/024 370/228 |
| 2015/0208265 | A1* | 7/2015 | Dalsgaard ............ H04B 17/382 370/252 |
| 2015/0304959 | A1* | 10/2015 | Jitsukawa ............. H04W 16/28 455/522 |

FOREIGN PATENT DOCUMENTS

| | | |
|---|---|---|
| WO | 2012152993 A1 | 11/2012 |
| WO | 2013122164 A1 | 8/2013 |

OTHER PUBLICATIONS

Unknown, Author, "Heterogeneous Network Deployment Scenarios", Ericsson, 3GPP TSG-RAN WG1 #70bis, R1-124513, San Diego, CA, Oct. 8-12, 2012, 1-3.

Unknown, Author, "Initial considerations on Heterogeneous Networks for UMTS", Ericsson, St-Ericsson, 3GPP TSG RAN WG1 Meeting #70bis, R1-124512, San Diego, CA, USA, Oct. 8-12, 2012, 1-7.

Unknown, Author, "Overview of Combined Cell Deployment in Heterogeneous Networks", Ericsson, 3GPP TSG RAN WG1 Meeting #72, R1-130610, St. Julian's, Malta, Jan. 28-Feb. 1, 2013, 1-12.

Unknown, Author, "Proposed SID: Study on UMTS Heterogeneous Networks", Huawei, HiSilicon, TSG RAN Meeting #57, RP-121436, Chicago, USA, Sep. 4-7, 2012, 1-5.

* cited by examiner

METHOD AND NODE FOR CONTROLLING COMBINING OF RADIO SIGNALS FROM A USER EQUIPMENT

TECHNICAL FIELD

The present disclosure relates generally to a method and a controlling node of a cellular network for wireless communication, for controlling a signal combining operation performed on uplink radio signals transmitted from a User Equipment, UE, present in a combined cell served by multiple radio nodes in the cellular network.

BACKGROUND

In recent years, different types of cellular networks for wireless communication have been developed to provide radio access for various wireless terminals in different areas. The cellular networks are constantly improved to provide better coverage and capacity to meet the demands from subscribers using services and increasingly advanced terminals, e.g. smartphones and tablets, which often require considerable amounts of bandwidth and resources for data transport in the networks. As a result, it is common to configure a network with cells of varying types and sizes, e.g. in an overlapping fashion, to provide needed capacity and flexibility depending on expected traffic intensity in different areas, the cells forming a so-called heterogeneous cellular network.

In this disclosure, the term "User Equipment, UE" will be used to represent any user-controlled wireless terminal or device capable of radio communication including receiving downlink signals transmitted from a radio node of a wireless communication network. Further, the term "radio node", also commonly referred to as a base station, e-nodeB, eNB, etc., represents any node of a wireless communication network that can communicate uplink and downlink radio signals with UEs. The radio nodes described here may include so-called macro nodes and low power nodes.

A heterogeneous cellular network thus comprises hierarchically arranged radio nodes, e.g. including macro nodes transmitting with relatively high power and covering relatively large areas of a size in the order of kilometers, and low power nodes transmitting with relatively low power and covering areas of a size in the order of a few meters, e.g. micro, pico, femto and relay nodes, to mention some customary examples. The low power nodes may be employed together with the macro nodes in an overlapping fashion to locally provide added capacity in so-called "hot spot" areas such that multiple small areas served by such micro/pico/femto/relay nodes may be located within the area served by a macro node.

The above-described heterogeneous network may be realized such that a macro node and multiple low power nodes cover individual cells with different cell identifiers, which means that a UE is served by one radio node at a time and must undergo handover between the cells when necessary to maintain adequate radio coverage. Alternatively, the macro node and the low power nodes may instead cover the same common cell with a single cell identifier, which means that a UE in the cell can be connected to and served by multiple radio nodes at the same time. The radio nodes of such a combined cell, sometimes also called a "soft cell" or "shared cell", can be regarded as a distributed radio node with multiple antennas at separate physical locations in the cell. In this disclosure, the term combined cell is used to represent such a cell served by multiple radio nodes using the same cell identifier. It should be noted that a combined cell may, without limitation, comprise any number of macro nodes and low power nodes.

Figure 1:
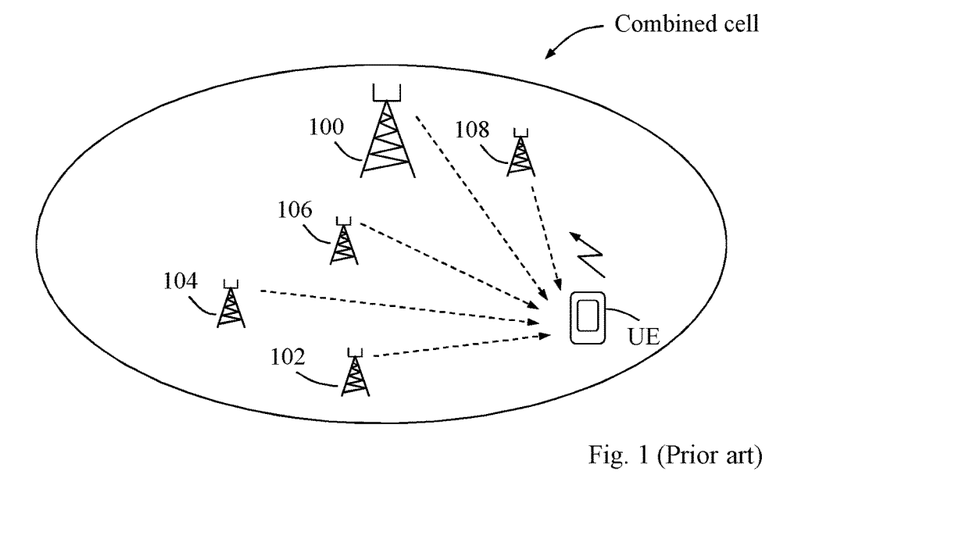
FIG. 1 is a communication scenario illustrating a UE in communication with multiple radio nodes in a combined cell, according to the prior art.

The latter alternative of using a combined cell covered by multiple radio nodes has the advantage of eliminating the need for performing handover which reduces the amount of signaling both in the radio interface and in the network, and also avoids the risk of dropped connection due to failed handover, among other things. FIG. 1 illustrates an example of a combined cell being served by a macro node 100 serving the entire cell, more or less, and a set of low power nodes 102-108 serving considerably smaller areas, not shown. Depending on its location, a UE present in the cell may receive downlink signals from any of the radio nodes 100-108 as suggested by dashed arrows.

Uplink radio signals, e.g. containing data or control information, transmitted from the UE may also be received by several, if not all, of the radio nodes which are able to process the radio signals jointly or in some coordinated way. It is thus another advantage with the above-described concept of combined cell that it enables an operation of signal combining on uplink signals from the UE when received by the multiple radio nodes. The operation of signal combining on signals received by two or more physically separated antennas is well-known as such in this field and is not necessary to describe in any detail to understand this disclosure. For example, each node may receive and decode the radio signals from the UE and may further perform channel estimation individually which can be utilized in a coordinated manner to achieve correct decoding.

However, It is thus a problem that the operation of signal combining on uplink radio signals transmitted from a UE present in a combined cell may be imperfect and even unsuccessful which naturally degrades the communication with the UE. As a result, the UE may be required to make frequent re-transmissions and/or increase its transmit power, which typically increases the level of interference in the cell as well as in one or more neighboring cells. If the signal combining operation is unsuccessful, the connection may even be lost altogether and the radio communication with the UE is consequently interrupted.

SUMMARY

It is an object of embodiments described herein to address at least some of the problems and issues outlined above. It is possible to achieve this object and others by using a method and a controlling node as defined in the attached independent claims.

According to one aspect, a method is performed by a controlling node of a cellular network for wireless communication, to control a signal combining operation performed on uplink radio signals transmitted from a User Equipment, UE, present in a combined cell served by multiple radio nodes in the cellular network. In this method, the controlling node receives signal quality information from the UE indicating a signal quality measured by the UE on a node-specific probing pilot signal transmitted from each of the multiple radio nodes. The controlling node then selects a subset of the multiple radio nodes based on the received channel quality information, and the signal combining operation is performed on the uplink radio signals received by the selected subset of the multiple radio nodes.

According to another aspect, a controlling node of a cellular network for wireless communication is configured to control a signal combining operation performed on uplink radio signals transmitted from a UE present in a combined cell served by multiple radio nodes in the cellular network. The controlling node comprises a receiving unit configured to receive signal quality information from the UE indicating a signal quality measured by the UE on a node-specific probing pilot signal transmitted from each of the multiple radio nodes. The controlling node also comprises a selecting unit configured to select a subset of the multiple radio nodes based on the received channel quality information, and a combining unit configured to perform the signal combining operation on the uplink radio signals received by the selected subset of the multiple radio nodes.

When employing the above method and controlling node, only radio nodes that are deemed to provide useful signals will be used for the signal combining operation. Any radio nodes of the combined cell which receive and detect uplink radio signals improperly such that they would deteriorate the signal combining operation, are excluded from the signal combining operation. It is thus an advantage of the solution that it can improve the reception of uplink signals in a combined cell in this way.

The above method and controlling node may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

In this solution, it has been recognized that when signal combining is employed in a combined cell served by multiple radio nodes, one or more of the radio nodes may not be able to receive and detect uplink radio signals from a UE properly, e.g. due to imperfect channel estimation, which may instead cause disturbing noise in the signal combining operation. The performance of the signal combining operation can therefore be improved if such radio nodes which receive and detect uplink radio signals improperly, i.e. such that it would impair the signal combining operation, are excluded from the signal combining operation. This can be achieved by evaluating the radio nodes of the cell in terms of signal quality measured by the UE on node-specific probing pilot signals, and selecting a subset of radio nodes providing the "best" signal quality in the UE. The signal combining operation is then performed on the UE's uplink radio signals as received only by the selected subset of radio nodes which thus can be expected to contribute with useful signal reception to the signal combining operation. The solution may be realized by means of a controlling node as follows.

Figure 2:
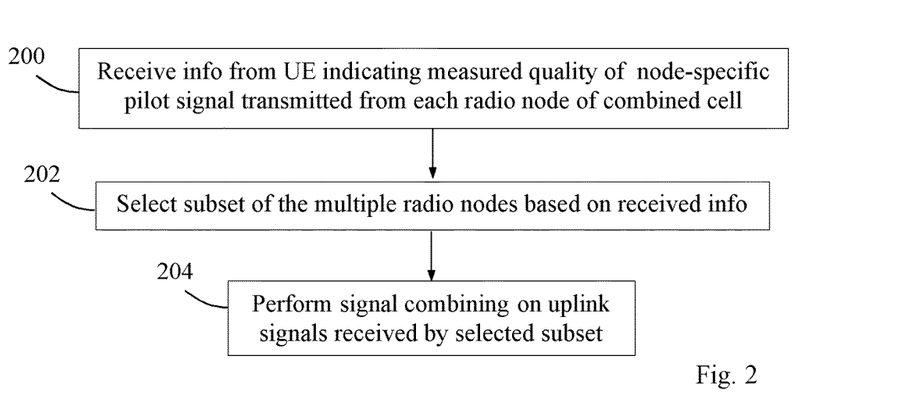
FIG. 2 is a flow chart illustrating a procedure in a controlling node for controlling a signal combining operation on signals from a UE, according to some possible embodiments.

A procedure with actions performed by a controlling node of a cellular network for wireless communication, for controlling a signal combining operation performed on uplink radio signals transmitted from a UE present in a combined cell, will now be described with reference to the flow chart in FIG. 2. It is assumed that the combined cell is served by multiple radio nodes in the cellular network, which radio nodes may include any number of macro nodes and low power nodes. The solution is not limited to any specific usage of particular radio nodes. It is also assumed that it is possible to perform a signal combining operation on the radio signals when received by the radio nodes of the combined cell. It is thus an object of this solution to make the signal combining operation of the combined cell successful and well-working. In case the multiple radio nodes comprise a macro node and a set of low power nodes, this procedure and controlling node may be implemented in the macro node. Alternatively, the procedure and controlling node may be implemented in a centralized node serving multiple combined cells in the cellular network.

A first action 200 illustrates that the controlling node receives signal quality information from the UE indicating a signal quality measured by the UE on a node-specific probing pilot signal transmitted from each of the multiple radio nodes. The radio nodes of the combined cell are thus configured to transmit a node-specific probing pilot signal which is distinct and unique for each radio node at least within the combined cell, hence "node-specific". Further, the UE is configured to perform quality measurements on the individual node-specific probing pilot signals and to report the measurement results to a radio node serving the UE in the radio communication, e.g. a macro node or any other suitable radio node of the combined cell. It is assumed that the quality of the downlink channel of each radio node is indicative of the quality of the uplink channel to that radio node as well.

The above action 200 may be realized in different ways and some possible embodiments are briefly outlined below. In one example, the node-specific reference signals may be transmitted from the multiple radio nodes on a Fractional Common Pilot Channel, F-CPICH. The F-CPICH may be defined by a spreading code, e.g. with a Spreading Factor, SF=256, and a scrambling code which is either a primary scrambling code or a secondary scrambling code of the combined cell. The transmit power level of the channel F-CPICH may be indicated to the UE during an initial cell connection procedure which enables the quality measurement. According to a possible implementation, a pilot signal which is common to all the radio nodes of the combined cell may, in addition to F-CPICH, be continuously transmitted on a Primary Common Pilot Channel P-CPICH. From these two different pilot signals transmitted on F-CPICH and P-CPICH, respectively, the UE is able to estimate the channel and to send back a CQI associated with these two pilots at two time intervals.

In another example, the signal quality information may be received from the UE on an uplink feedback channel called High Speed Dedicated Physical Common Control Channel or any other channel useful for quality reporting, depending on the implementation. In further useful examples, the signal quality may be indicated in the signal quality information by means of one or more quality-related parameters measured by the UE on the node-specific probing pilot signal from each respective radio node, which may include at least one of the following: a Channel Quality Indicator, CQI, a Reference Signal Received Quality, RSRQ, a Signal to Noise Ratio, SNR, and a Signal to Interference and Noise Ratio, SINR. Various conventional techniques are available for measuring and determining the above parameters that the UE can use, which are however outside the scope of this solution.

Returning to FIG. 2, another action 202 illustrates that the controlling node selects a subset of the multiple radio nodes based on the channel quality information received from the UE. Basically, the controlling node includes two or more of the radio nodes which are deemed to detect uplink signals from the UE with enough accuracy to be able to contribute to the signal combining operation in a beneficial manner. In one possible example, the controlling node selects at least two radio nodes for which the signal quality of their probing pilot signals received by the UE is above a quality threshold, which may be determined from the signal quality information received in action 200. The quality threshold may have been defined such that a radio node that provides a signal quality above the threshold at the UE can be deemed to contribute to the signal combining operation in a beneficial manner.

In another possible example, the controlling node selects a specific number N of radio nodes for which the signal quality of their probing pilot signals received by the UE is "better" than for the remaining radio nodes serving the cell, e.g. by having a higher value of CQI, RSRQ, SNR, SINR or other quality-related parameter, as measured by the UE according to the received signal quality information. In further possible examples, selecting the subset of the multiple radio nodes may comprise including a radio node which is serving the UE by receiving uplink data from the UE, and/or including a radio node which is serving the UE by sending downlink data to the UE. Thus, the radio node(s) serving the UE by receiving uplink data and/or sending downlink data may be mandatory to include in the subset, e.g. in addition to other radio nodes.

Having selected the subset of radio nodes in action 202, the controlling node proceeds to perform the signal combining operation on the uplink radio signals transmitted by the UE and received by the selected subset of the multiple radio nodes, in a final shown action 204.

Figure 3:
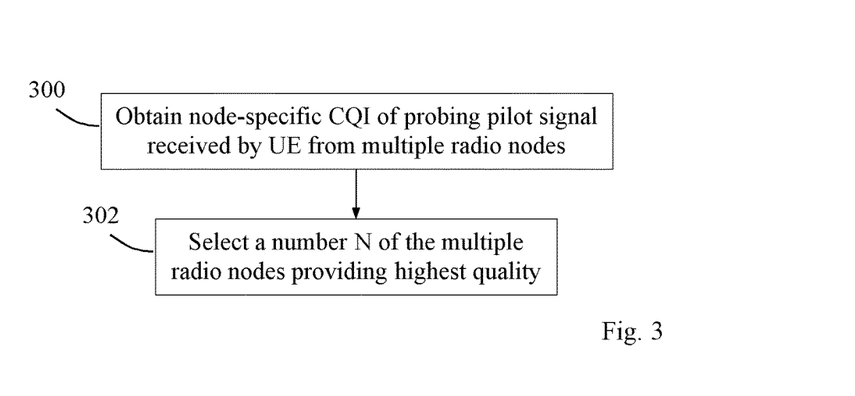
FIG. 3 is a flow chart illustrating a procedure in a controlling node for selecting radio nodes, according to further possible embodiments.

FIG. 3 illustrates another exemplifying procedure performed by the controlling node when selecting radio nodes for inclusion in the above-described subset of radio nodes to be used for the signal combining operation. In an action 300, the controlling node obtains a node-specific CQI value determined and reported by the UE for each node-specific probing pilot signal transmitted from the respective radio nodes. The controlling node then compares the obtained node-specific CQI values and selects a number N of radio nodes for which the signal quality of their probing pilot signals received by the UE is better than for the remaining radio nodes serving the cell, according to their respective node-specific CQI values, in an action 302. In other words, the N "best" radio nodes are selected and included in the subset, with respect to their resulting CQI values.

Figure 4:
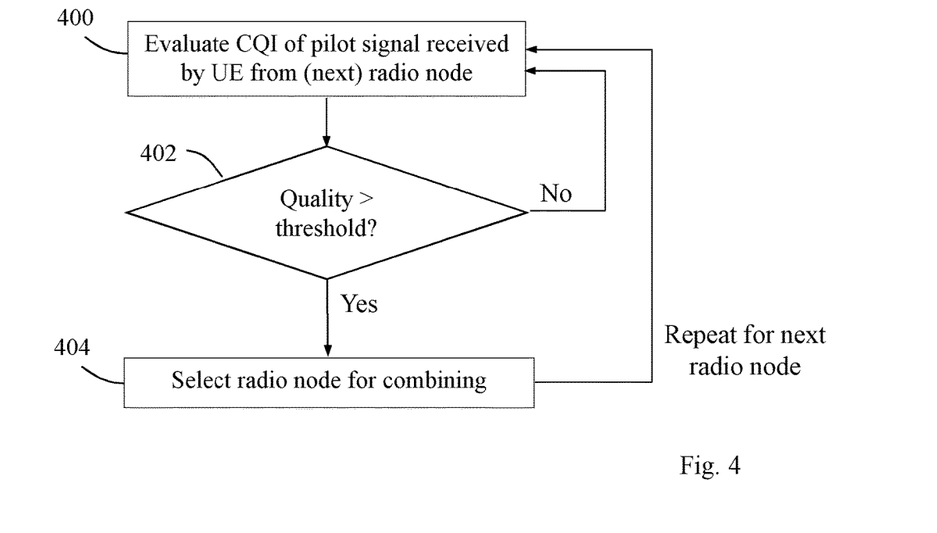
FIG. 4 is a flow chart illustrating another procedure in a controlling node for selecting radio nodes, according to further possible embodiments.

FIG. 4 illustrates another alternative procedure performed by the controlling node for selecting radio nodes for inclusion in the above-described subset of radio nodes to be used for the signal combining operation. In this example, the radio nodes of the combined cell are evaluated one by one in view of a quality threshold as follows. In an action 400, the controlling node thus evaluates a node-specific CQI value determined and reported by the UE for a node-specific probing pilot signal transmitted from a respective radio node. The controlling node compares the CQI value with the quality threshold in an action 402 and if the CQI value is above the quality threshold, that radio node is selected for inclusion in the subset of radio nodes to be used for the signal combining operation, as of action 404.

On the other hand, if the CQI value is not above the quality threshold, the radio node is not selected for inclusion in the subset of radio nodes. In either case, the process returns to action 400 for evaluating the next radio node of the multiple radio nodes of the combined cell in the above manner. This process may thus be repeated until all radio nodes have been evaluated, or until a timeout period has expired, or until enough radio nodes have been included, depending on the implementation. It should be noted that it is possible that not each and every radio node of the combined cell are evaluated in this way, e.g. if the UE has not reported a CQI value for one or more nodes for some reason such as when the signal from a distant radio node is too weak for detection and measurement by the UE, or when the reported CQI value does not reach any serving network node, and so forth.

FIGS. 3 and 4 are thus examples of how action 202 above may be performed according to different possibilities. Even though CQI was used as quality-related parameter in the examples of FIGS. 3 and 4, it should be understood that any other quality-related parameter may be used, e.g. one or more of the parameters exemplified above.

Figure 5:
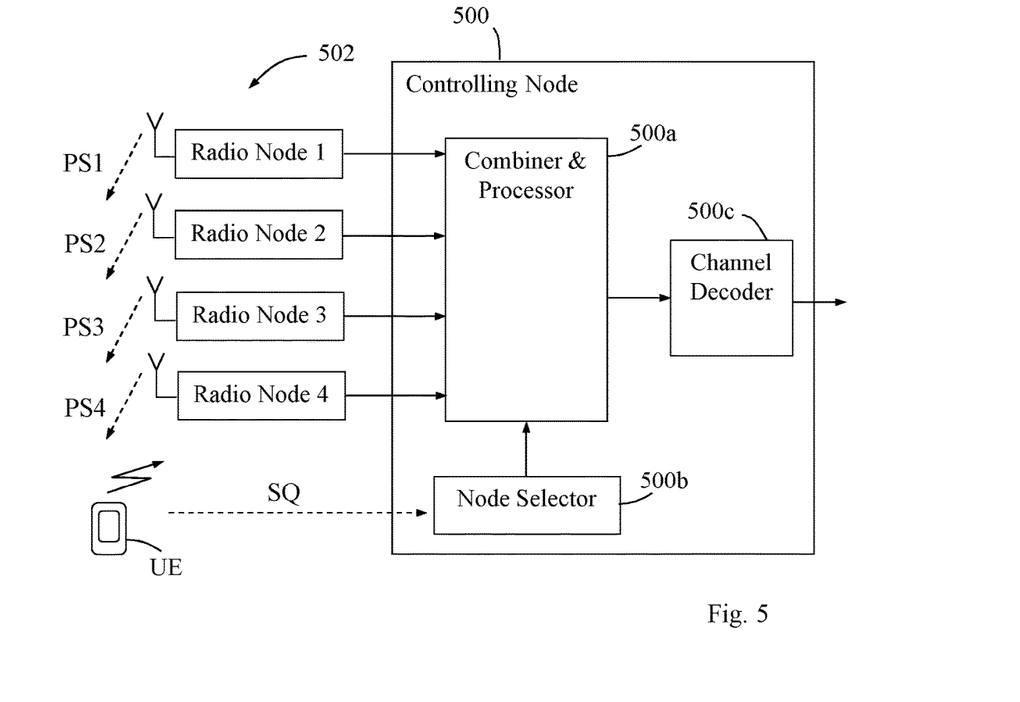
FIG. 5 is a block diagram illustrating how a controlling node may operate in practice, according to further possible embodiments.

An example of how the above-described controlling node may operate in practice will now be described with reference to FIG. 5. The controlling node 500 in this example has a combiner function and processor 500a, for performing the signal combining operation. The combiner function and processor 500a are connected to multiple physically separated radio nodes 502, of which four radio nodes 1-4 are shown here, thus serving a combined cell as described above. Further, the controlling node 500 also has a node selector function 500b and a channel decoder function 500c. The combiner function and processor 500a is thus able to process and combine uplink radio signals received by any of these radio nodes 502.

Each radio node 502 transmits a node-specific probing pilot signal denoted "PS" in the figure. Accordingly, radio node 1 transmits its own distinct and unique probing pilot signal PS1, and in the same manner radio nodes 2, 3 and 4 transmit their own distinct and unique probing pilot signals PS2, PS3 and PS4, respectively. Provided that the UE is within "hearing" distance, it is therefore able to detect the node-specific probing pilot signals, one by one, and measure the signal quality of the detected probing pilot signals.

Having performed these measurements, the UE transmits signal quality information "SQ" indicating the measured signal quality of each node-specific probing pilot signal, over one or more radio nodes currently serving the UE which information is received by the controlling node, as in action 200 described above. For example, the signal quality information SQ may comprise a node-specific CQI value for each radio node, thus CQI-1 measured by the UE on PS1, CQI-2 measured on PS2, CQI-3 measured on PS3, and CQI-4 measured on PS4. As mentioned above, the radio nodes 1-4 may send their node-specific probing pilot signals on the F-CPICH and the UE may send the signal quality information SQ on the uplink feedback channel called High Speed Dedicated Physical Control Channel, HS-DPCCH, although the solution is not limited to these examples.

The node selector 500*b* then evaluates the radio nodes 1-4 by virtue of their node-specific values CQI-1-CQI-4 in the signal quality information SQ, and selects a subset of the radio nodes 1-4 based on the received channel quality information, as in action 202 described above. For example, two of the radio nodes 1-4 may be selected, e.g. for providing a CQI value above a quality threshold as of the example in FIG. 4, or when the number N of radio nodes to select is 2 as of the example in FIG. 3. Again, CQI was used as an illustrative example and it may be replaced by any other suitable quality-related parameters such as any of the above mentioned examples of RSRQ, SNR and SINR.

Uplink signals transmitted by the UE and received only by the selected radio nodes in the subset are then processed and combined by the combiner function and processor 500*a*, e.g. according to regular procedures not necessary to describe here as such. Each radio node in the subset may use a detector, e.g. comprising a matched filter which equalizes individual channel fading for each respective link. In this case, a channel estimate is needed for each link. Once the signal combining is done, the resultant signal is passed from the combiner function and processor 500*a* through the channel decoder 500*c* in a regular manner, e.g. via a so-called "channel de-interleaver" in the case a data channel is used. The operation of the channel decoder 500*c* is however beyond the scope of this solution.

The CQI estimated by the UE from the node-specific probing pilot signal on the F-CPICH indicates a channel quality that can be expected for uplink signals from the UE to the respective radio nodes. A corresponding CQI value may be computed by the UE using P-CPICH which indicates a channel quality using the combined nodes, determined from the above-mentioned pilot signal that is common to all the radio nodes of the combined cell. In practice, these two CQIs may be time multiplexed and sent by the UE on the HS-DPCCH. The same HS-DPCCH signal is received by all the radio nodes 1-4. The combiner function and processor 500*a* is thus able to process the signal received by all the radio nodes 1-4 on the HS-DPCCH, to obtain the node-specific CQI values determined and reported by the UE.

Figure 6:
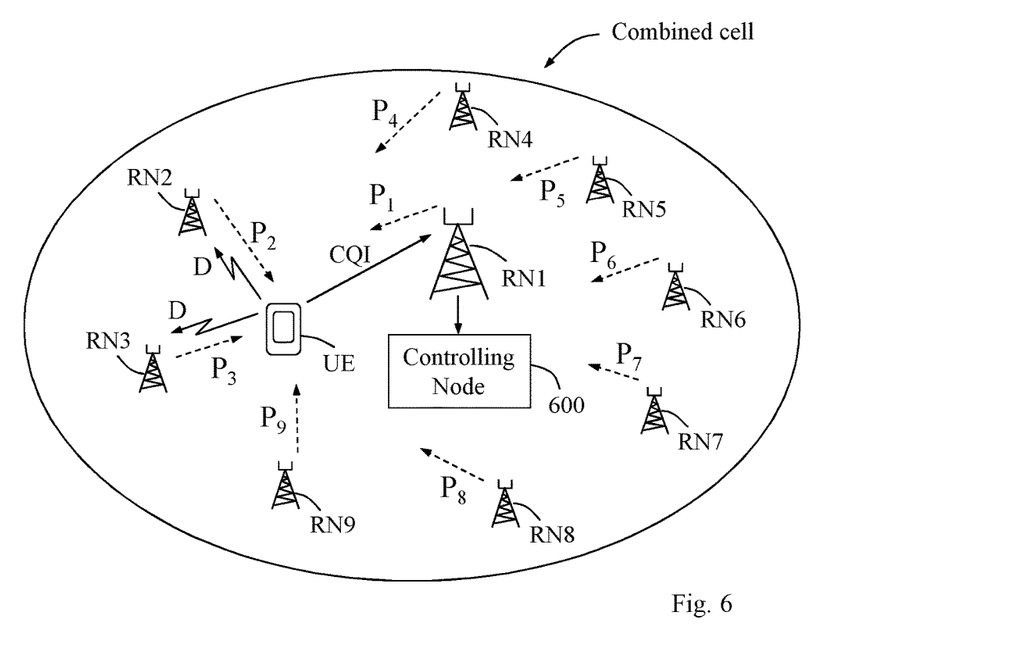
FIG. 6 is a communication scenario illustrating radio nodes in a combined cell where a controlling node is employed, according to further possible embodiments.

A communication scenario will now be described with reference to FIG. 6 where a controlling node 600 is employed according to any of the examples described above. The figure illustrates a combined cell served by a macro node RN1 and multiple low power nodes RN2-RN9 of a heterogeneous network. It is assumed that the macro node RN1 is currently serving a UE present in the cell. All radio nodes RN1-RN9 in the cell transmit a node-specific probing pilot signal $P_1$-$P_9$, respectively, as shown in the figure. The UE detects and measures the node-specific probing pilot signal from at least some of the radio nodes RN1-RN9 and sends signal quality information with corresponding CQIs to the macro node RN1.

The controlling node evaluates the radio nodes based on the signal quality information and selects radio nodes RN2 and RN3 as a subset of radio nodes, e.g. using some suitable selection criteria such as those described above for FIGS. 3 and 4. In this selection, radio nodes RN2 and RN3 are deemed to be able to contribute with useful signal reception to the signal combining operation. Accordingly, the signal combining operation is then performed on uplink signals with data D transmitted from the UE and received by the radio nodes RN2 and RN3 only.

Figure 7:
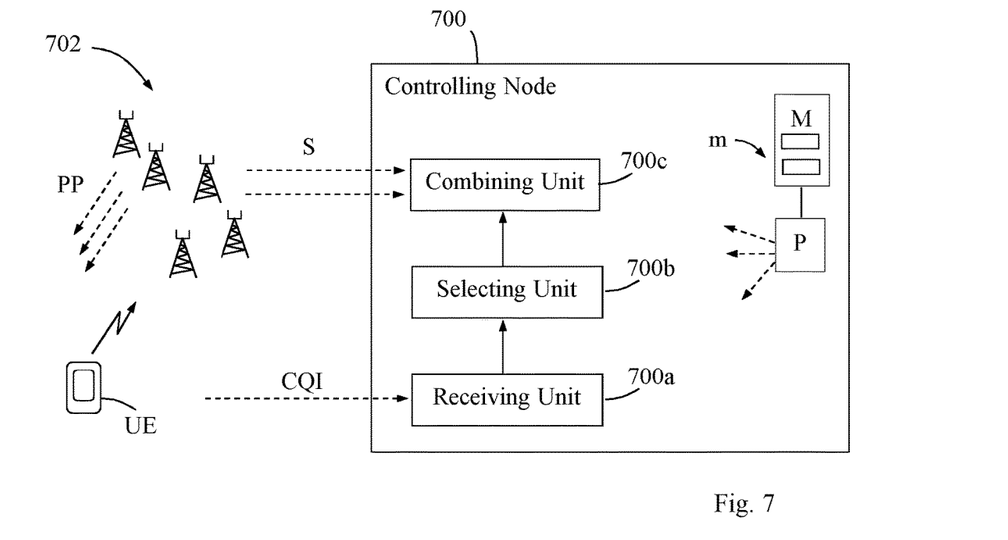
FIG. 7 is a block diagram illustrating a controlling node in more detail, according to further possible embodiments.

A detailed but non-limiting example of how a controlling node of a cellular network for wireless communication may be structured with some possible functional units to bring about the above-described operation of the controlling node, is illustrated by the block diagram in FIG. 7. In this figure, the controlling node 700 is configured to control a signal combining operation performed on uplink radio signals transmitted from a UE present in a combined cell served by multiple radio nodes 702 in the cellular network. The controlling node 700 may be configured to operate according to any of the examples and embodiments described above and as follows. The controlling node 700 will now be described in terms of some possible examples of employing the solution.

The controlling node 700 comprises a receiving unit 700*a* configured to receive signal quality information from the UE indicating a signal quality measured by the UE on a node-specific probing pilot signal PP transmitted from each of the multiple radio nodes, basically as described above for action 200. The controlling node 700 further comprises a selecting unit 700*b* configured to select a subset of the multiple radio nodes based on the received channel quality information, basically as described above for action 202. The controlling node 700 also comprises a combining unit 700*c* configured to perform the signal combining operation on the uplink radio signals received by the selected subset of the multiple radio nodes, basically as described above for action 204.

The above controlling node 700 and its functional units 700*a-c* may be configured or adapted to operate according to various optional embodiments. In a possible embodiment, the selecting unit 700*b* may be configured to select the subset of the multiple radio nodes by selecting at least two radio nodes for which the signal quality of their probing pilot signals received by the UE is above a quality threshold. In another example, the selecting unit 700*b* may be configured to select the subset of the multiple radio nodes by selecting a specific number N of radio nodes for which the signal quality of their probing pilot signals received by the UE is better than for the remaining radio nodes serving the cell.

In further examples, the selecting unit 700*b* may be configured to select the subset of the multiple radio nodes by including a radio node which is serving the UE by receiving uplink data from the UE, and or by including a radio node which is serving the UE by sending downlink data to the UE. The data receiving and transmitting radio nodes in the latter examples may be the same node or different nodes.

The receiving unit 700*a* may also be configured to receive the signal quality information from the UE on the uplink feedback channel HS-DPCCH. In case the multiple radio nodes comprise a macro node transmitting with a relatively higher power and a set of low power nodes transmitting with a relatively lower power, the controlling node may be implemented in the macro node. Alternatively, the controlling node may be implemented in a centralized node serving multiple combined cells in the cellular network.

It should be noted that FIG. 7 illustrates various functional units in the controlling node 700 and the skilled person is able to implement these functional units in practice using suitable software and hardware. Thus, the solution is generally not limited to the shown structures of the controlling node 700, and the functional units 700*a-c* may be configured to operate according to any of the features described in this disclosure, where appropriate.

The functional units 700*a-c* described above can be implemented in the controlling node 700 by means of program modules of a respective computer program comprising code means which, when run by a processor "P" causes the controlling node 700 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the controlling node 700 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the controlling node 700.

While the solution has been described with reference to specific exemplary embodiments, the description is generally only intended to illustrate the inventive concept and should not be taken as limiting the scope of the solution. For example, the terms "controlling node", "User Equipment, UE", "radio node", "signal quality information", "probing pilot" and "threshold" have been used in this description, although any other corresponding entities, functions, and/or parameters could also be used having the features and characteristics described here. The solution is defined by the appended claims.

The invention claimed is:

1. A method, performed by a controlling node of a cellular network for wireless communication, to control a signal combining operation performed on uplink radio signals transmitted from a User Equipment (UE) present in a cell served by multiple radio nodes in the cellular network using a same cell identifier, the method comprising:
receiving signal quality information from the UE indicating a signal quality measured by the UE for each node-specific probing pilot signal transmitted on a Fractional Common Pilot Channel (F-CPICH) from each of the multiple radio nodes, wherein the signal quality information further indicates a signal quality measured by the UE for a pilot signal transmitted on a Primary Common Pilot Channel (P-CPICH) that is common to all of the multiple radio nodes;
selecting a subset of the multiple radio nodes based on the signal quality measurements indicated in the received signal quality information for the pilot signals transmitted on the F-CPICHs and for the pilot signal transmitted on the P-CPICH; and
performing the signal combining operation on the uplink radio signals received by the selected subset of the multiple radio nodes.

2. The method of claim 1, wherein selecting the subset of the multiple radio nodes comprises selecting at least two radio nodes for which the respective signal quality of each of their probing pilot signals received by the UE is above a quality threshold.

3. The method of claim 1, wherein selecting the subset of the multiple radio nodes comprises selecting a specific number N of radio nodes for which the respective signal quality of each of their probing pilot signals received by the UE is better than for the remaining radio nodes serving the cell.

4. The method of claim 1, wherein selecting the subset of the multiple radio nodes comprises including a radio node that is serving the UE by receiving uplink data from the UE.

5. The method of claim 1, wherein selecting the subset of the multiple radio nodes comprises including a radio node that is serving the UE by sending downlink data to the UE.

6. The method of claim 1, wherein each signal quality is indicated in the signal quality information by at least one of: Channel Quality Indicator (CQI), Reference Signal Received Quality (RSRQ), Signal to Noise Ratio (SNR), and Signal to Interference and Noise Ratio (SINR).

7. The method of claim 1, wherein the signal quality information is received from the UE on an uplink feedback channel called High-Speed Dedicated Physical Control Channel (HS-DPCCH).

8. The method of claim 1, wherein the multiple radio nodes comprise a macro node transmitting with a relatively high power and a set of low power nodes transmitting with a relatively low power, and wherein the controlling node is implemented in the macro node.

9. The method of claim 1, wherein the controlling node is implemented in a centralized node serving multiple cells in the cellular network, each being served by multiple radio nodes using a same cell identifier.

10. A controlling node of a cellular network for wireless communication, the controlling node being configured to control a signal combining operation performed on uplink radio signals transmitted from a User Equipment (UE) present in a cell served by multiple radio nodes in the cellular network using a same cell identifier, the controlling node comprising:
receiving circuitry configured to receive signal quality information from the UE indicating a signal quality measured by the UE for each node-specific probing pilot signal transmitted on a Fractional Common Pilot Channel (F-CPICH) from each of the multiple radio nodes, wherein the signal quality information further indicates a signal quality measured by the UE for a pilot signal transmitted on a Primary Common Pilot Channel (P-CPICH) that is common to all of the multiple radio nodes; and
processing circuitry operatively associated with the receiving circuitry and configured to:
select a subset of the multiple radio nodes based on the signal quality measurements indicated in the received signal quality information for the pilot signals transmitted on the F-CPICHs and for the pilot signal transmitted on the P-CPICH; and
perform the signal combining operation on the uplink radio signals received by the selected subset of the multiple radio nodes.

11. The controlling node of claim 10, wherein the processing circuitry is configured to select the subset of the multiple radio nodes by selecting at least two radio nodes for which the respective signal quality of each of their probing pilot signals received by the UE is above a quality threshold.

12. The controlling node of claim 10, wherein the processing circuitry is configured to select the subset of the multiple radio nodes by selecting a specific number N of radio nodes for which the respective signal quality of each of their probing pilot signals received by the UE is better than for the remaining radio nodes serving the cell.

13. The controlling node of claim 10, wherein the processing circuitry is configured to select the subset of the multiple radio nodes by including a radio node that is serving the UE by receiving uplink data from the UE.

14. The controlling node of claim 10, wherein the processing circuitry is configured to select the subset of the multiple radio nodes by including a radio node that is serving the UE by sending downlink data to the UE.

15. The controlling node of claim 10, wherein each signal quality is indicated in the signal quality information by at least one of: Channel Quality Indicator (CQI), Reference Signal Received Quality (RSRQ), Signal to Noise Ratio (SNR), and Signal to Interference and Noise Ratio (SINR).

16. The controlling node of claim 10, wherein the receiving circuitry is configured to receive the signal quality information from the UE on an uplink feedback channel called High-Speed Dedicated Physical Control Channel (HS-DPCCH).

17. The controlling node of claim 10, wherein the multiple radio nodes comprise a macro node transmitting with a relatively high power and a set of low power nodes transmitting with a relatively low power, and wherein the controlling node is implemented in the macro node.

18. The controlling node of claim 10, wherein the controlling node is implemented in a centralized node serving multiple cells in the cellular network, each being served by multiple radio nodes using the same cell identifier.

* * * * *